US012774991B1

(12) United States Patent
Martim et al.

(10) Patent No.: US 12,774,991 B1
(45) Date of Patent: Oct. 27, 2026

(54) SENSOR TESTING SUPPORT SYSTEM

(71) Applicant: Tractian Technologies Inc, Atlanta, GA (US)

(72) Inventors: Vinicius Martim, São Paulo (BR); Lucas Inácio, São Paulo (BR); João Cadorin Falleiros, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/425,485

(22) Filed: Dec. 18, 2025

(51) Int. Cl.
*G01N 29/12* (2006.01)
*G01N 29/22* (2006.01)

(52) U.S. Cl.
CPC ........... *G01N 29/12* (2013.01); *G01N 29/223* (2013.01)

(58) Field of Classification Search
USPC .......................................................... 73/1.86
See application file for complete search history.

(56) References Cited

U.S. PATENT DOCUMENTS 3,677,061 A * 7/1972 Visser .................... G01N 29/30 73/1.86
3,975,939 A * 8/1976 McLean ................. G01N 29/30 73/610
4,043,176 A * 8/1977 Graham ................. G01V 13/00 73/587
2014/0318213 A1* 10/2014 Tsao .................. G01N 29/4436 73/1.86
2022/0120716 A1* 4/2022 Irie ..................... G01M 5/0066

* cited by examiner

*Primary Examiner* — Daniel S Larkin
(74) *Attorney, Agent, or Firm* — Cognition IP, P.C.; Edward Steakley; Schiller Hill

(57) ABSTRACT

The system and methods provide for reliable testing and calibration of sensor devices. The system includes a support assembly configured to removeably attach a sensor device to a vibrating member of a shaker device. Vibrational signals are generated by the shaker device and transmitted through the support assembly to the sensor device being tested or calibrated. A reference sensor, attached to the support assembly is used to collect reference data that is used in the calibration and testing. The system is configured to determine a frequency response of the sensor device being tested. The support assembly is constructed through an additive manufacturing process from one or more ceramic materials.

20 Claims, 8 Drawing Sheets

SENSOR TESTING SUPPORT SYSTEM

FIELD

The present invention relates generally to systems, tools, and methods for precise vibration transmission for sensor calibration and testing.

BACKGROUND

Testing and calibration of sensor devices usually includes the mounting of a plate or table to a stimuli device. However, the plate/table have a limited thickness, resulting in several bending vibration modes that interfered with the measurements.

The present invention provides for a more rigid mounting of a reference sensor and sensor device to the stimuli device, allowing for a more direct transmission of vibrations to the sensor device.

SUMMARY

The systems and methods described herein provide for the calibration and testing of sensor assemblies. In some embodiments, the system and methods may be configured to generate, by a vibrating member of a stimuli device, a vibrational signal. The vibrational signal may be a traveling wave generated along a primary direction.

In some embodiments, generation of the vibrational signal may be controlled by a testing controller. The testing controller may be configured to adjust an amplitude and frequency of the vibrational signal generated by the stimuli device.

The vibrational signal may be transmitted through a support assembly to a reference sensor and a target device. The reference sensor and the target device may both be rigidly attached to the support assembly.

In some embodiments, the support assembly may comprise a support structure comprising one or more hollow regions and one or more ribs. The support assembly may include a reference sensor mounting point, wherein the reference sensor mounting point is configured to rigidly attach the reference sensor to the support assembly in a position in line with the traveling wave. In some embodiments, the support assembly may further include a support interface configured to hold the target device in a horizontal orientation to the primary direction. In some embodiments, a main axis of the target device may be perpendicular to the primary direction. The support assembly may further include one or more vibration source fixture points, wherein the vibration source fixture points rigidly attach the support assembly to the vibrating member of the stimuli device.

In some embodiments, the system may be configured to measure, by the reference sensor, the generated vibrational signal, and generate reference data based on the reference sensor measurements. The target device may also measure the generated vibrational signal and generate target data based on said measurements.

In some embodiments, the testing controller may retrieve the reference data and the target data and determine a frequency response for the target device based on the reference data and target data.

In some embodiments, the support assembly may be constructed from one or more ceramic materials. The construction may be performed by one or more additive manufacturing processes. In some embodiments, the additive manufacturing process may be stereolithography (SLA) 3D printing. The starting material of the 3D printing process may include one or more ceramic resins comprising a photopolymerizable monomer and ceramic particles.

In some embodiments, the ceramic particles may be an oxide based ceramic material. In some embodiments, the oxide based ceramic material may be alumina ($Al_2O_3$), zirconia ($ZrO_2$), silica ($SiO_2$), yttria ($Y_2O_3$) or combination thereof.

In some embodiments, ceramic particles may be a carbide, nitride or MAX phase based ceramic material.

In some embodiments, walls of the support assembly may be less than a predetermined thickness. Said predetermined thickness may be based on one or more curing properties of the ceramic resin and one or more parameters of the printing process. Such parameters may include wavelength of the light source, intensity/power of the light source, exposure times of each layer, or combination thereof. The parameters may also include any variable that affects the curing and material properties of the resin or ceramic. In some embodiments, the predetermined thickness may be less than 5 mm.

In some embodiments, the support assembly may be post processed. Post processing may comprise one or more heat treatment processes. The one or more heat treatment processes may comprise debinding, sintering, or annealing.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
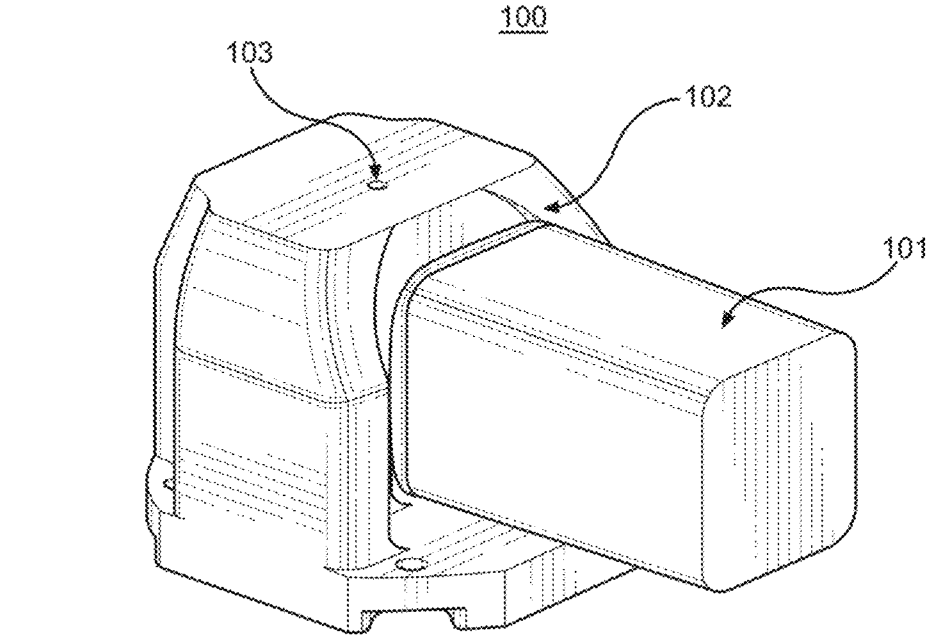
FIG. 1A is a diagram illustrating an exemplary calibration and testing support assembly in which some embodiments may operate.
Figure 1B:
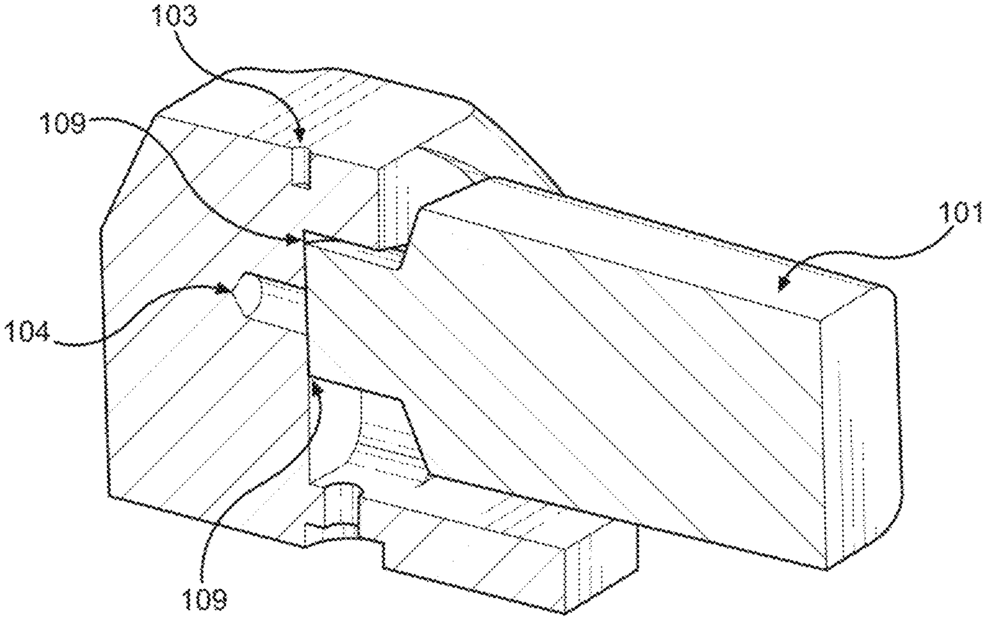
FIG. 1B is a diagram illustrating an exemplary calibration and testing support assembly in which some embodiments may operate.
Figure 1C:
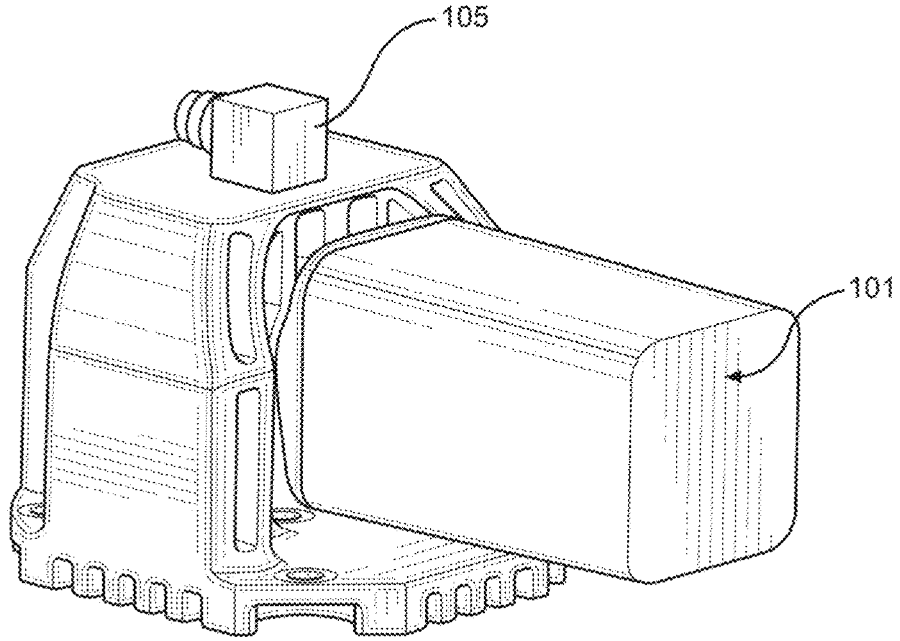
FIG. 1C is a diagram illustrating an exemplary calibration and testing support assembly in which some embodiments may operate.
Figure 1D:
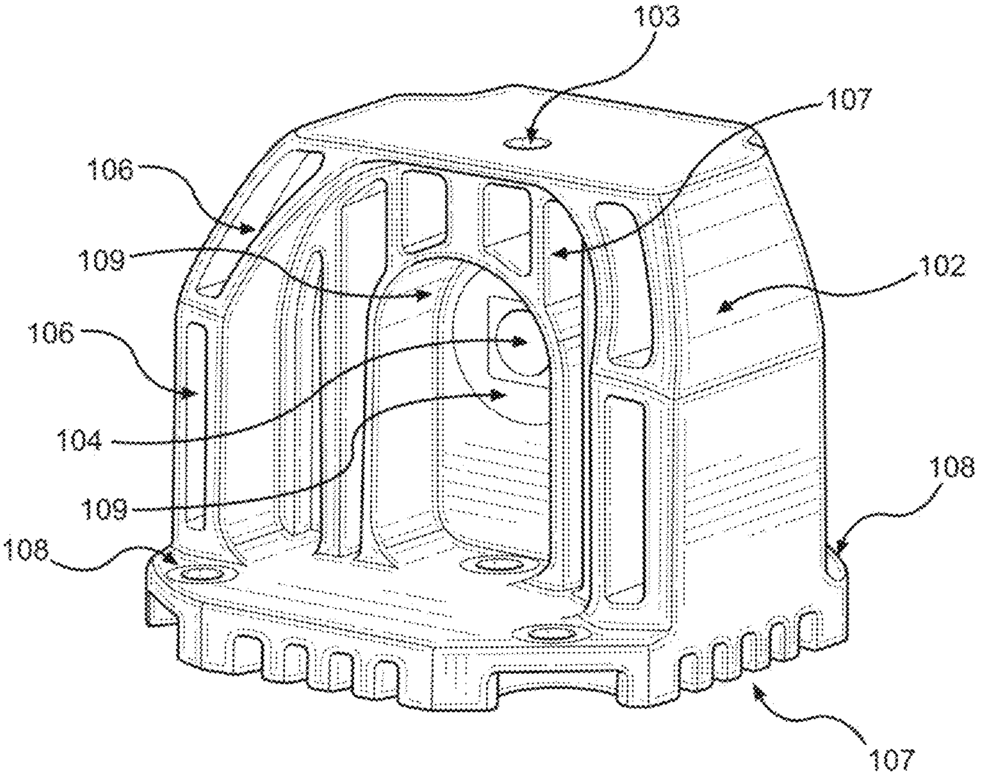
FIG. 1D is a diagram illustrating an exemplary calibration and testing support assembly in which some embodiments may operate.
Figure 1E:
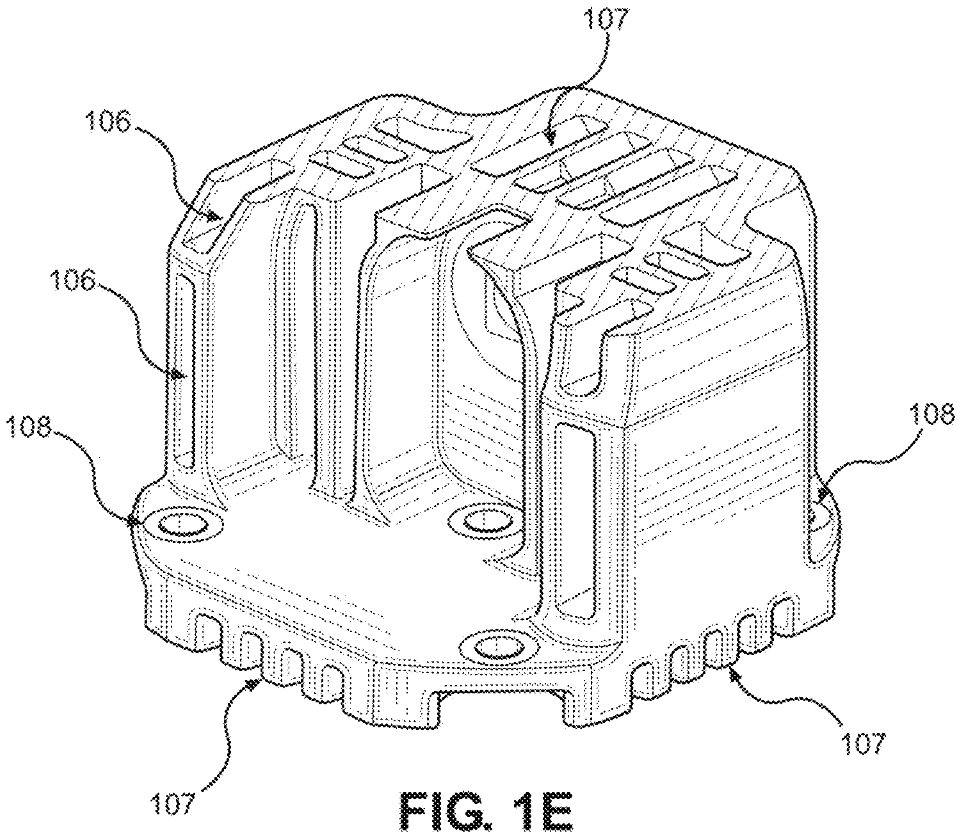
FIG. 1E is a diagram illustrating an exemplary calibration and testing support assembly in which some embodiments may operate.
Figure 1F:
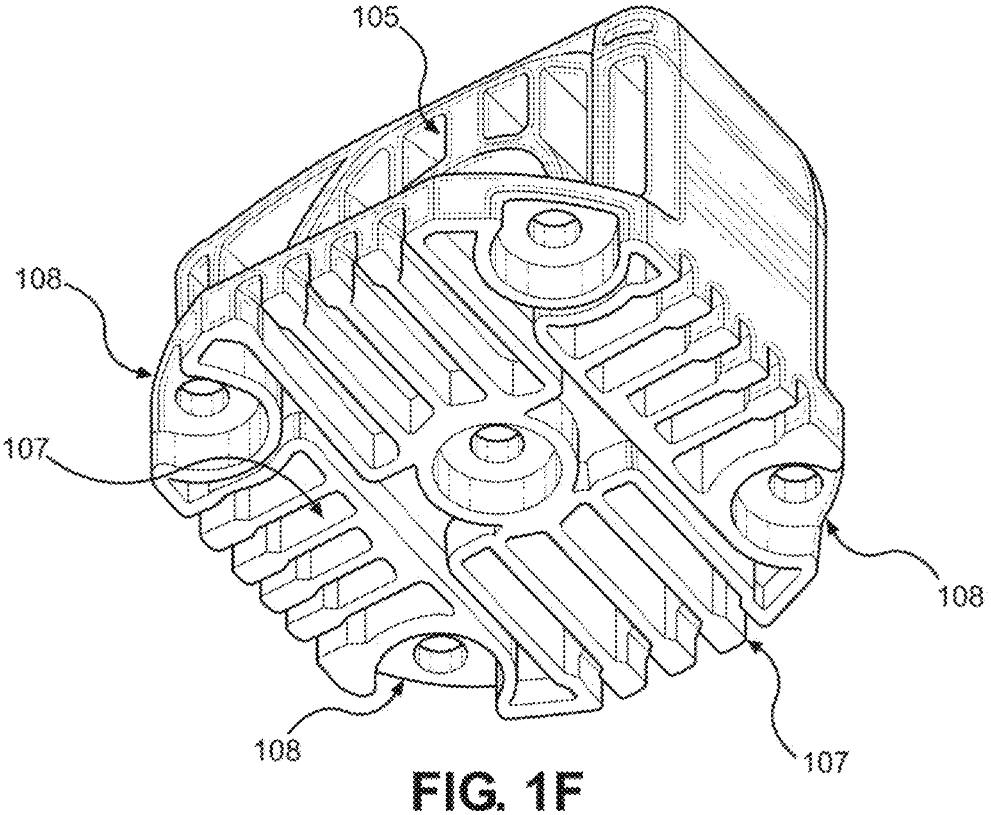
FIG. 1F is a diagram illustrating an exemplary calibration and testing support assembly in which some embodiments may operate.
Figure 1G:
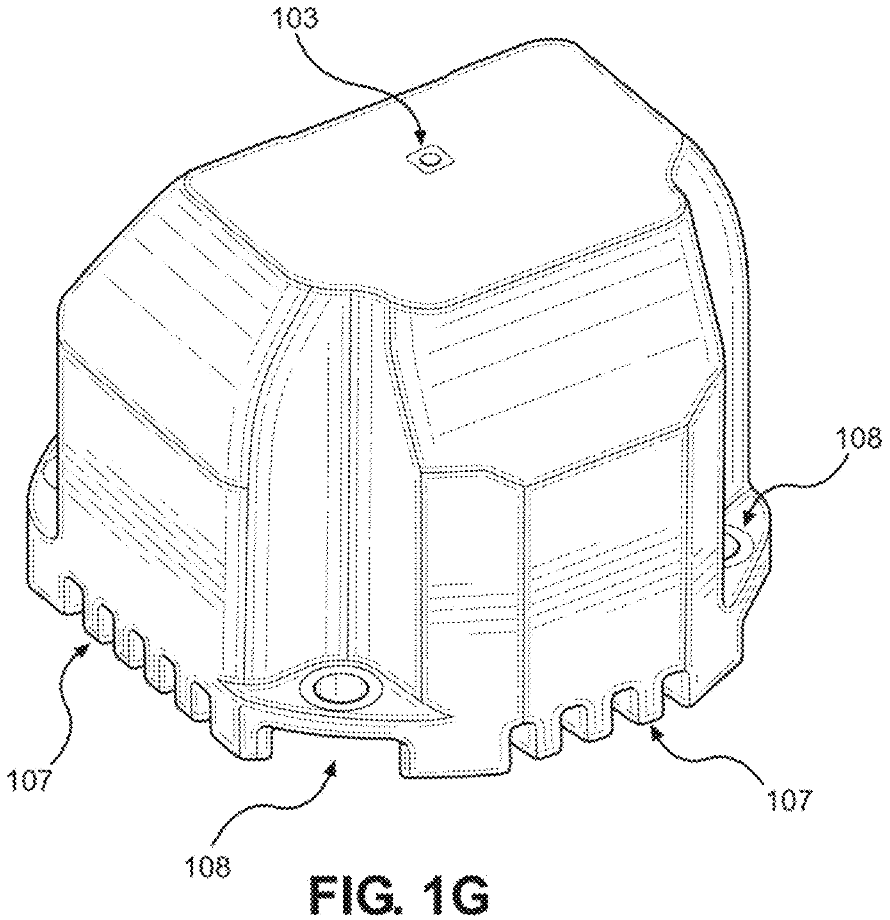
FIG. 1G is a diagram illustrating an exemplary calibration and testing support assembly in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, apparatus, and methods for testing and calibrating target devices, wherein the target devices comprise one or more sensors configured to detect vibrations. The sensors may include pressure sensors, gyroscopes, accelerometers, and/or other devices configured to measure movement of the target device. In some embodiments, the sensors of the target device and the reference sensor may comprise a 3, 6, or 9 degrees of freedom (DOF) inertial measurement unit (IM).

In some embodiments, the system may be configured to provide precise vibration transmission for sensor calibration and testing under a predetermined frequency range.

In some embodiments, a support assembly is used to ensure reliable calibration and test runs of lateral excitation for a sensor assembly (target device). Testing and calibration may include measuring the vibration with more accurate sensors (reference sensors) and comparing that measurement with readings of the target device under test.

In some embodiments, one or more reference sensors, one or more target devices and one or more input stimuli devices may be connected or attached to one another. In some embodiments, the input stimuli device may be configured to generate mechanical signals to test and calibrate the target devices.

In some embodiments, the one or more reference sensors and one or more target devices may be attached to the support assembly at fixations points. The fixation points may be flat fixation points wherein a reference sensor or target device is bonded using an adhesive. In some embodiments, the flat fixation point may be configured to mount a reference sensor or target device magnetically. In some embodiments, a combination of magnetic and adhesive mounting may be used. In some embodiments, the adhesive bonding of the reference sensors and target devices may be used to mimic alternative installation conditions that vibration sensors may encounter in real use.

In some embodiments, the fixation point may be a threaded hole or other interface configured to mechanically fasten the reference sensor or target device to the support assembly.

In some embodiments, the support assembly may be attached to the input stimuli device using the same or similar fixation points as discussed above.

In some embodiments, the target device may produce frequencies that interfere with the vibrations being received by the target device. The sensor readings may be different from the actual vibrations being monitored due to this interference. In some embodiments, the interference may comprise a natural frequency induced in the target device and/or the support assembly. In some embodiments, the interference may be a result of poor transmission of the vibrations from the vibration source to the support assembly and/or from the support assembly and the sensor device.

FIGS. 1A-1G are diagrams illustrating an exemplary calibration and testing support assembly 100 in which some embodiments may operate. The support assembly 100 may comprise reference sensor mounting hole 103, sensor device mounting hole 104, one or more hollow regions 106, one or more ribs 107, one or more vibration source fixture points 108, and a support interface 109.

FIGS. 1A-1G show the exemplary support assembly 100, wherein the support assembly is configured to attach to a stimuli device in line with the stimuli device's direction of motion/oscillation. For example, the support assembly 100 may be attached to the vibrating member of a vibration generator. In some embodiments, the one or more vibration source fixture points 108 may be used to rigidly attach the support assembly 100 to the stimuli device. The vibration source fixture points 108 may be configured to engage one or more fastening mechanisms, such as screws, bolts, nuts, or quick release mechanisms.

The reference sensor mounting hole 103 may be configured to allow for reference sensor 105 to be rigidly attached to the support assembly.

In some embodiments, the support structure 102 of the support assembly may be made of hollow regions 106 and ribs 107. Hollow regions 106 and ribs 107 may be created by removing material from the support assembly. Such removal may be performed by one or more subtractive manufacturing processes. In some embodiments, the hollow regions 106 and ribs 107 may be constructed through one or more additive manufacturing processes.

In some embodiments, hollow regions 106 and ribs 107 may be used to reduce system resonances by removing mass in regions where stiffness contribution is minimal. Optimization of the ribs 107 can meaningfully improve the frequency response of the support assembly itself and consequently enhance the behavior of the entire system formed by the support assembly and the input stimuli device.

In some embodiments, the support assembly 100 may further be configured to hold or otherwise attach a sensor device 101 in a horizontal or perpendicular orientation to the direction of travel of a longitudinal wave generated by the stimuli device. In some embodiments, the orientation of the sensor device may be such that the direction of the vibration is not aligned with the main axis of the sensor device 101.

In some embodiments, the support interface 109, between the support assembly 100 and the sensor device 101, may be configured to restrain rotation of the sensor device 101. The sensor device 101 may be attached using the sensor device mounting hole 104. The sensor device mounting hole 104 may comprise one or more retaining mechanisms configured to rigidly attach the sensor device 101 to the support assembly 100. In some embodiments, the sensor device mounting hole 104 may be threaded to allow a threaded male member of a sensor device 101 to be securely screwed into the mounting hole 104.

Figure 1H:
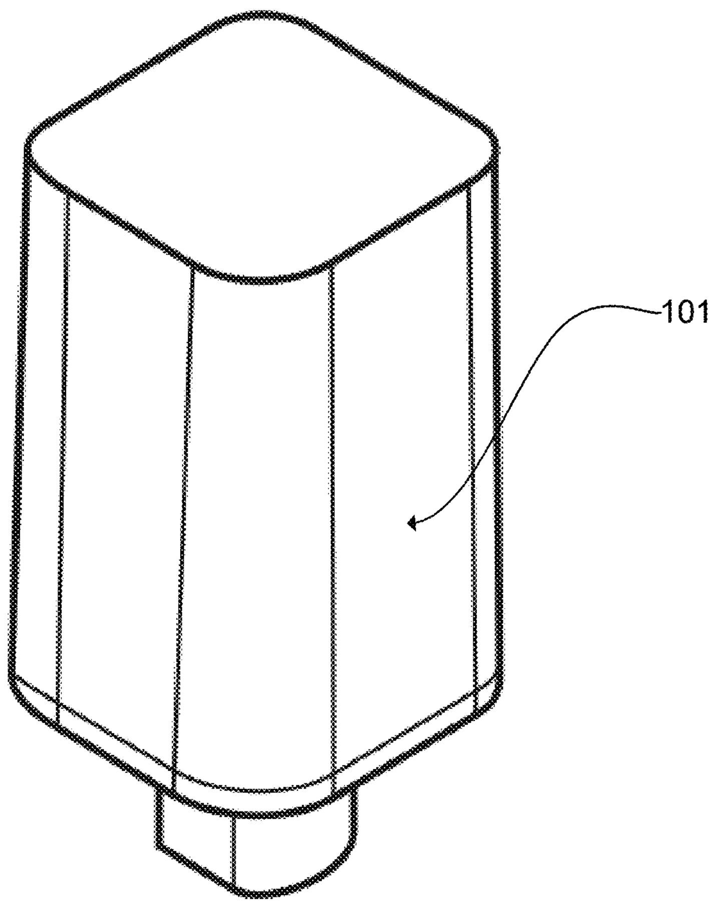
FIG. 1H is a diagram illustrating an exemplary sensor device in which some embodiments may operate.

In some embodiments, the accuracy of the frequency response across different axes may differ. For example, the frequency response may be more accurate when the sensor device 101 is being vibrated along its main axis. With regard to FIG. 1H, the main axis may be the axis of symmetry in the vertical direction.

Figure 2:
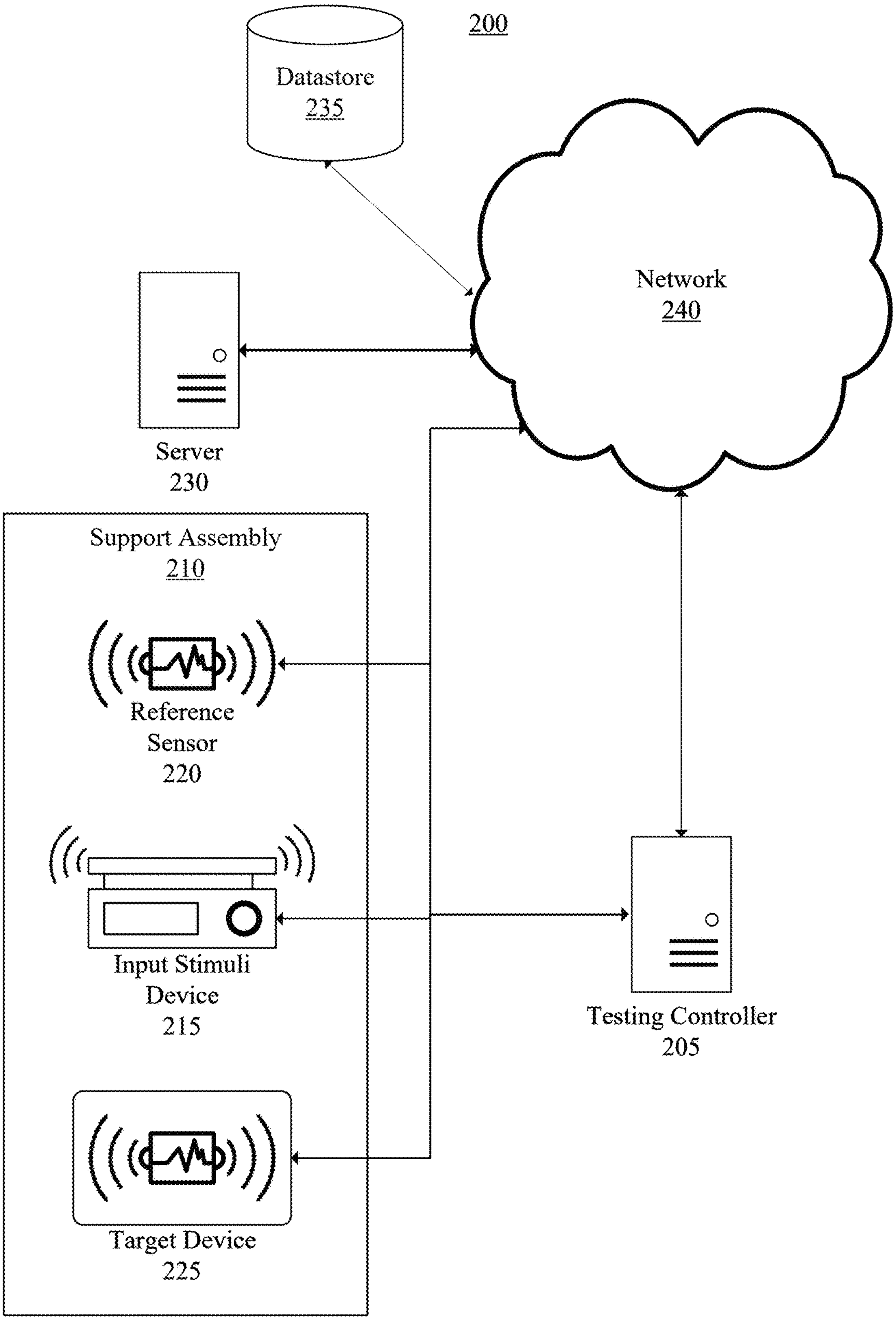
FIG. 2 is a diagram illustrating an exemplary testing and calibration system in accordance with aspects of the present disclosure.

FIG. 2 is a diagram illustrating an exemplary testing and calibration system 200 in accordance with aspects of the present disclosure.

The testing and calibration system 200 may comprise one or more testing controllers 205, one or more support assemblies 210, one or more input stimuli devices 215, one or more reference sensors 220, one or more target devices 225, one or more servers 230, one or more datastores 235 and a network 240.

The testing controller 205 may be one or more physical or virtual machines configured to communicate with the one or more input stimuli devices 215, one or more reference sensors 220, one or more target devices 225, one or more servers 230 and one or more datastores 235 over network 240.

In some embodiments, testing controller 205 may communicate directly with input stimuli device 215, reference sensor 220, and/or target device 225. In some embodiments, testing controller 205 may send instruction for operation to input stimuli device 215. The instructions may be sent directly, or through network 240. Sensor data collected by reference sensor 220 and target device 225 may be retrieved by testing controller 205 directly or through network 240. In some embodiment, reference sensor 220 and target device 225 may send collected sensor data and operational information to server 230, where it may then be accessed by the testing controller 205.

In some embodiments, the testing controller 205 may be configured to determine a frequency response of the target device 225. Determination of the frequency response is important in the calibration and testing of the target device. The determined frequency response may be used to correct sensor reading in field operations. In some embodiments, the frequency response may be calculated based on the sensor data collected from the reference sensor 220 and the target device 225.

Small variations in the material or production process of each target device may result in each target device having a different frequency response. This is important in the calibration of each device, ensuring that measurements captured by each of the target devices 225 correlate as accurately as possible to the real world vibrations that are being monitored.

Since different fixation methods directly affect how vibrations are transmitted to the device, the testing controller 205 may be configured to analyze the frequency response under different mounting conditions, such as adhesive-based and magnetic based mountings. The frequency response may be tracked for each mounting type and used to calibrate the target device based on how the device will be mounted when deployed in the field.

In some embodiments, the center of mass of the support assembly with a target device attached may not align with the source of the vibration. This may generate lateral and/or torsional motion of the target device. The system may be configured to measure said lateral and torsional motion of the target device. These measurements may then be used in the calculation of the frequency response and/or in the calibration of the target device. The frequency response and the measured lateral and tortional motion may also be used to post process data received from the target device.

Support assembly 210 may be configured to rigidly mount reference sensor 220 and target device 225 to the input stimuli device 215. In some embodiments, the support assembly 210 may be configured to be lightweight, rigid, machinable, and compatible with one or more input stimuli devices 215, such as shakers or vibration generators. In some embodiments, the support assembly 210 may be constructed from aluminum, steel, tungsten, magnesium, carbon fiber, ceramic, or combination thereof. Other materials may also be used in the construction of the support assembly.

In some embodiments, the reference sensor 220 and/or the target device may be mounted using a flat fixation surface. In some embodiments, the support assembly 210 may allow adhesive or magnetic bonding of the reference sensor 220 and the target device 225. In some embodiments, a combination of adhesive bonding, magnetic bonding, and attachment with fasteners, such as screws and bolts. In some embodiments, the support assembly may be configured to attach to the input stimuli device 215 through one or more of the attachment methods listed above.

In some embodiments, the support assembly may be machined from billets of metals, such as aluminum and steel. The support assembly may be machined from a single piece of material or from multiple pieces of material. In some embodiments, machined parts may be welded or otherwise bonded to one another to construct the support assembly.

In some embodiments, a casting process may be used to form one or more parts of the support assembly. The casting may be ceramic or metal casting.

In some embodiments, the support assembly may be machined from ceramic stock. In some embodiments, the support assembly may be green machined, wherein an unfired ceramic is machined before being fired. In some embodiments, the support assembly may be machined from ceramic stock after it has been fired.

Constructing the support assembly from ceramic brings meaningful advantages. The higher elasticity modulus of a ceramic support assembly provides a stiffer connection between the reference sensor and target device while remaining lighter than metal. This reduced mass allows the input stimuli device 215 to use less power to drive the system and helps avoid unwanted resonances caused by the total mass of the support assembly.

In some embodiments, the support assembly may be 3D printed from ceramic, polymers, reinforced polymers, and/or metals. The 3D printing process may include stereolithography (SLA), binder jetting, fused filament fabrication (FFF)/fused deposition modeling (FDM), inkjet printing, selective laser sintering (SLS), selective laser melting (SLM), or laminated object manufacturing (LOM).

In some embodiments, the support assembly 210 may be constructed from a combination of additive manufacturing and subtractive manufacturing. For example, a 3D printed support assembly 210 may be finished with a subtractive manufacturing process, such as CNC milling or other processes. The 3D printed part may have threads tapped after printing. In some embodiments, threads and other features may be created during the 3D printing process.

In some embodiments, the support assembly 210 may be printed from a ceramic material. The ceramic materials may be an oxide or non-oxide ceramic. Non-oxide ceramics may include carbide, nitride, or MAX phase based ceramic materials.

In some embodiments, a stereolithographic process may be used to 3D print the support assembly 210. The starting material for the process may be a ceramic resin comprising a photopolymerizable monomer and ceramic particles. In some embodiments, upon completion of the printing process, the support assembly 210 may be washed or cleaned to remove any uncured resin. Washing may be performed with alcohol, water, or other solvent.

The support assembly 210 may then be dried and prepared for one or more heat treatment processes. In some embodiments, an additional curing step may be performed before the heat treatment processes. In some embodiments, the additional curing step may be performed during the drying process.

In some embodiments, the heat treatment processes may comprise debinding, sintering and/or annealing. The debinding may comprise a burnout step, wherein the support assembly 210 is heated in a kiln or oven to a degradation temperature of the binder/resin. This results in the removal of the binder from the part, leaving behind the green ceramic body.

After debinding, the support assembly 210 may be heated to a sintering temperature, wherein the ceramic particles are compacted together, increasing the density of the ceramic body. During this process, the size of the ceramic body (support assembly 210) may shrink. In some embodiments, the shrinkage along different dimensions of the ceramic body may be different.

In some embodiments, all features of the support assembly may not exceed a predetermined thickness. Said predetermined thickness may be determined based on curing properties of the ceramic resin and the light source used in the SLA printing process. In some embodiments, the thickness of the ceramic body (support assembly 210) walls may be 5 mm or less. In some embodiments, hollow regions and ribs may be used to replace regions of material that exceed said predetermined thickness.

The reference sensor 220 may be a physical or virtual sensor. In some embodiments, the reference sensor 220 may be a physical device that is configured to collect data corresponding to stimuli received from the input stimuli device 215. In some embodiments, the reference sensor 220 may be a virtual sensor configured to simulate operation of a physical sensor monitoring the input stimuli device 215. The simulation may directly generate virtual sensor data based on operation of the input stimuli device, control signals sent to the input stimuli device from the testing controller, status of the input stimuli device, testing configuration of the virtual sensor and other system variables. In some embodiments, the virtual sensor may be run as software or an interface within the testing controller 205.

In some embodiments, the reference sensor 220 may be configured to collect sensor data from a physical sensor and generate a virtual sensor based on said data. The virtual sensor may be configured to simulate the target device 225, allowing for a direct comparison between the virtual sensor data and the data collected by the target device 225 as a result of testing. The virtual sensor simulation may be of a similar device, such as a comparable model to the target device, an older or newer model of the target device or the same model.

The target device 225 may comprise a sensor assembly housing one or more inertial measurement units (IMUs). Other sensors or combination of sensors may be housed within the sensor assembly of the target device 225.

The servers 230 may be one or more physical or virtual machines configured to communicate with the one or more testing controllers 205, one or more input stimuli devices 215, one or more reference sensors 220, one or more target devices 225 and one or more datastores 235. The one or more servers 230 may be configured as a distributed computing infrastructure.

Datastores 235 may communicate with one another over network 240. Datastores 235 may be any storage device capable of storing data for processing or as a result of processing information at the one or more testing controllers 205, one or more input stimuli devices 215, one or more reference sensors 220, one or more target devices 225 or one or more servers 230. The datastores 235 may be a separate device or the same device as server 225. The datastores 235 may be located in the same location as that of servers 230, or at separate locations.

Network 240 may be an intranet, internet, mesh, LTE, GSM, peer-to-peer or other communication network that allows the one or more testing controllers 205, one or more input stimuli devices 215, one or more reference sensors 220, one or more target devices 225, one or more servers 230 and one or more datastores 235 to communicate with one another.

Figure 3:
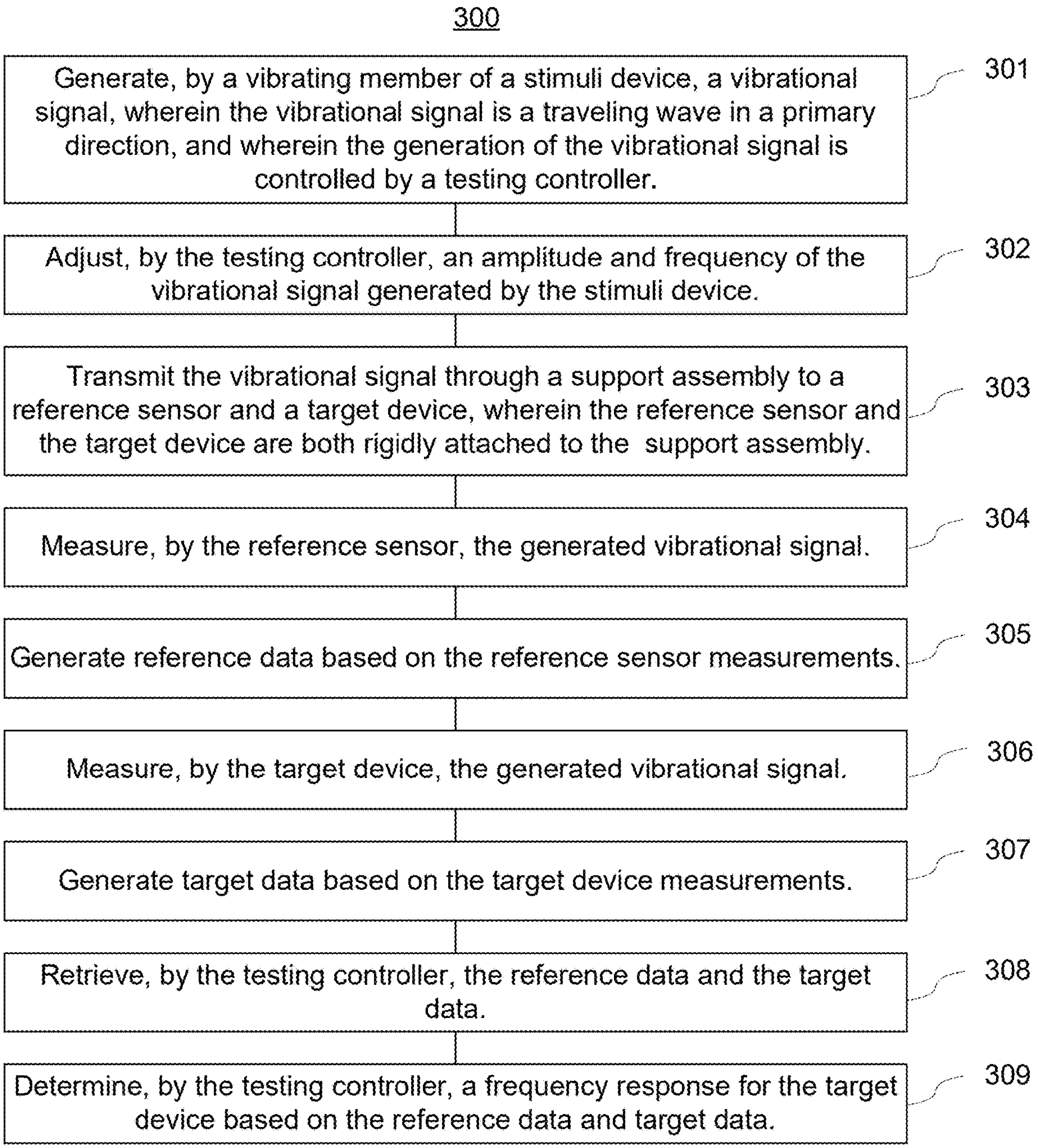
FIG. 3 is a flow chart illustrating an exemplary method that may be performed in accordance with some embodiments.

FIG. 3 is a flow chart illustrating an exemplary method 300 that may be performed in accordance with some embodiments.

At step 301, a vibrational signal is generated by a vibrating member of a stimuli device. The vibrational signal may be generated as a traveling wave in a primary direction. In some embodiments, the generation of the vibrational signal is controlled by a testing controller.

At step 302, the testing controller may adjust an amplitude and frequency of the vibrational signal generated by the stimuli device.

At step 303, the vibrational signal is transmitted through a support assembly to a reference sensor and a target device, wherein the reference sensor and the target device are both rigidly attached to the support assembly.

At step 304, the reference sensor measures the generated vibrational signal.

At step 305, reference data is generated based on the reference sensor measurements.

At step 306, the target device measures the generated vibrational signal.

At step 307, target data is generated based on the target device measurements.

At step 308, the testing controller retrieves the reference data and the target data.

At step 309, the testing controller then determines a frequency response for the target device based on the reference data and target data.

Figure 4:
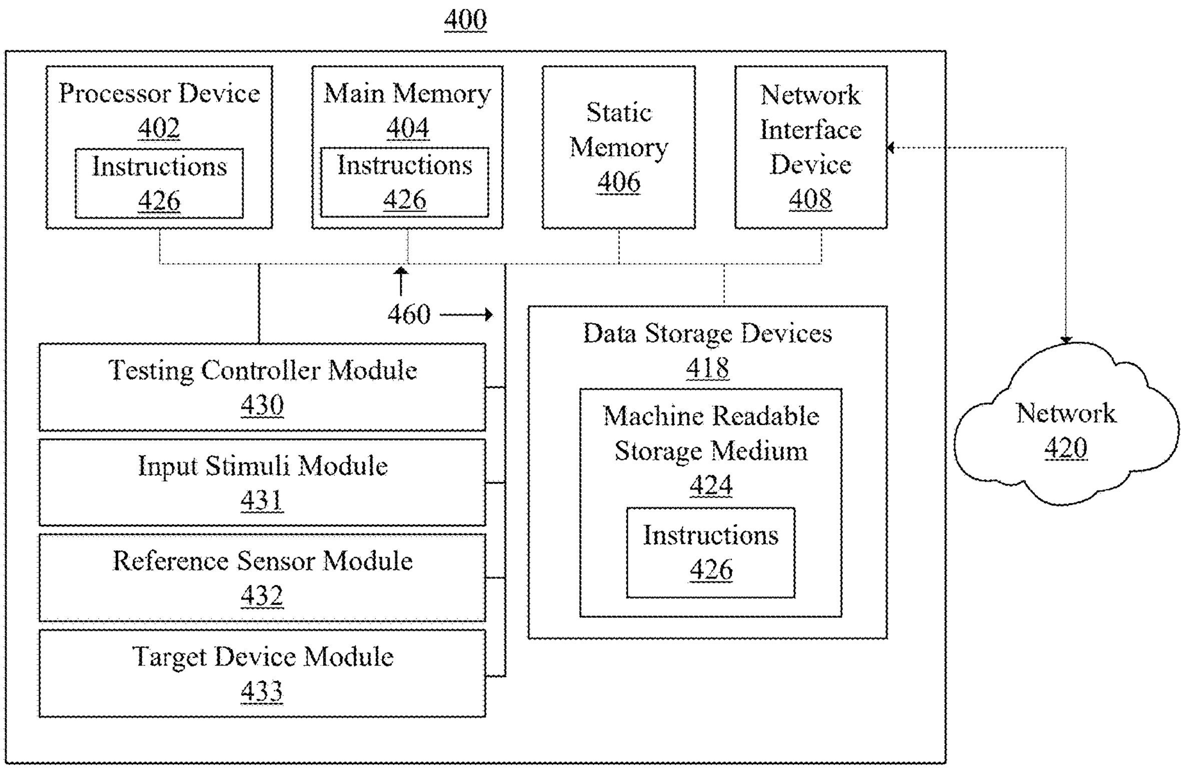
FIG. 4 is a diagram illustrating an exemplary computer/control system that may perform processing in some embodiments and in accordance with aspects of the present disclosure.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as, synchronous DRAM (SDRAM) or Rambus DRAM (RDRAM), etc.), a static memory 406 (e.g., flash memory, static random access memory (SRAM), etc.), and a data storage device 418, which communicate with each other via a bus 460.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices, such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420.

The computer system 400 may also include testing controller module 430, input stimuli module 431, reference sensor module 432, and target device module 433.

Testing controller module 430, input stimuli module 431 reference sensor module 432, and target device module 433 may be the same or similar to that of testing controller 205, input stimuli device 215, reference sensor 220, and target device 225 as disclosed in FIG. 2.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media. Information, including data used in the processes and methods of the system and the one or more sets of instructions or software, may also be stored in blockchain, as NFTs or other decentralized technologies.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A system for determining a frequency response of a target device, wherein the system comprises: a stimuli device, wherein the stimuli device comprises a vibrating member configured to generate traveling waves in a primary direction, and wherein the amplitude and frequency of the traveling waves are adjustable; a support assembly comprising: a support structure comprising one or more hollow regions and one or more ribs; a reference sensor, removeably coupled to the support assembly in a position in line with the traveling wave; a support interface configured to hold, in a horizontal orientation to the primary direction, the target device, wherein a main axis of the target device is perpendicular to the primary direction; and one or more vibration source fixture points, wherein the vibration source fixture points rigidly attach the support assembly to the vibrating member of the stimuli device; and a testing controller, wherein the testing controller is configured to: generate, by controlling the stimuli device, a vibrational signal; receive, from the reference sensor, reference readings corresponding to the vibrational signal; receive, from the target device attached to the support assembly, target device sensor data captured by the target device; and determine, based on the received reference readings and the target device sensor data, a frequency response for the target device.

Example 2. The system of Example 1, wherein the support assembly is constructed from one or more ceramic materials.

Example 3. The system of any one of Examples 1-2, wherein the support assembly is constructed by one or more additive manufacturing processes.

Example 4. The system of any one of Examples 1-3, wherein the additive manufacturing process is stereolithography (SLA) 3D printing, and wherein the starting material is a ceramic resin comprising a photopolymerizable monomer and ceramic particles.

Example 5. The system of any one of Examples 1-4, wherein the ceramic particles are an oxide based ceramic material, and wherein the oxide based ceramic material is: alumina (Al2O3); zirconia (ZrO2); silica (SiO2); or yttria (Y2O3).

Example 6. The system of any one of Examples 1-5, wherein the ceramic particles are a carbide, nitride or MAX phase based ceramic material.

Example 7. The system of any one of Examples 1-6, wherein walls of the support assembly are less than a predetermined thickness, and wherein said predetermined thickness is based on one or more curing properties of the ceramic resin and one or more parameters of the printing process.

Example 8. The system of any one of Examples 1-7, wherein the predetermined thickness is less than 5 mm.

Example 9. The system of any one of Examples 1-8, wherein the support assembly is post processed, and wherein said post processing comprises one or more heat treatment processes.

Example 10. The system of any one of Examples 1-9, wherein the one or more heat treatment processes comprise debinding, sintering, or annealing.

Example 11. A method for determining a frequency response of a target device, the method comprising: generating, by a vibrating member of a stimuli device, a vibrational signal, wherein the vibrational signal is a traveling wave in a primary direction, and wherein the generation of the vibrational signal is controlled by a testing controller; adjusting, by the testing controller, an amplitude and frequency of the vibrational signal generated by the stimuli device; transmitting the vibrational signal through a support assembly to a reference sensor and a target device, wherein the reference sensor and the target device are both rigidly attached to the support assembly, and wherein the support assembly comprises: a support structure comprising one or more hollow regions and one or more ribs; a reference sensor mounting point, wherein the reference sensor mounting point is configured to rigidly attach the reference sensor to the support assembly in a position in line with the traveling wave; a support interface configured to hold, in a horizontal orientation to the primary direction, the target device, wherein a main axis of the target device is perpendicular to the primary direction; and one or more vibration source fixture points, wherein the vibration source fixture points rigidly attach the support assembly to the vibrating member of the stimuli device; measuring, by the reference sensor, the generated vibrational signal; generating reference data based on the reference sensor measurements; measuring, by the target device, the generated vibrational signal; generating target data based on the target device measurements; retrieving, by the testing controller, the reference data and the target data; and determining, by the testing controller, a frequency response for the target device based on the reference data and target data.

Example 12. The method of Example 11, wherein the support assembly is constructed from one or more ceramic materials.

Example 13. The method of any one of Examples 11-12, wherein the support assembly is constructed by one or more additive manufacturing processes.

Example 14. The method of any one of Examples 11-13, wherein the additive manufacturing process is stereolithography (SLA) 3D printing, and wherein the starting material is a ceramic resin comprising a photopolymerizable monomer and ceramic particles.

Example 15. The method of any one of Examples 11-14, wherein the ceramic particles are an oxide based ceramic material, and wherein the oxide based ceramic material is: alumina (Al2O3); zirconia (ZrO2); silica (SiO2); or yttria (Y2O3).

Example 16. The method of any one of Examples 11-15, wherein the ceramic particles are a carbide, nitride or MAX phase based ceramic material.

Example 17. The method of any one of Examples 11-16, wherein walls of the support assembly are less than a predetermined thickness, and wherein said predetermined thickness is based on one or more curing properties of the ceramic resin and one or more parameters of the printing process.

Example 18. The method of any one of Examples 11-17, wherein the predetermined thickness is less than 5 mm.

Example 19. The method of any one of Examples 11-18, wherein the support assembly is post processed, and wherein said post processing comprises one or more heat treatment processes.

Example 20. The method of any one of Examples 11-19, wherein the one or more heat treatment processes comprise debinding, sintering, or annealing.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “identifying” or “determining” or “executing” or “performing” or “collecting” or “creating” or “sending” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for determining a frequency response of a target device, wherein the system comprises:

- a stimuli device, wherein the stimuli device comprises a vibrating member configured to generate traveling waves in a primary direction, and wherein the amplitude and frequency of the traveling waves are adjustable;
- a support assembly comprising:
  - a support structure comprising one or more hollow regions and one or more ribs;
  - a reference sensor, removeably coupled to the support assembly in a position in line with the traveling wave;
  - a support interface configured to hold, in a horizontal orientation to the primary direction, the target device, wherein a main axis of the target device is perpendicular to the primary direction; and
  - one or more vibration source fixture points, wherein the vibration source fixture points rigidly attach the support assembly to the vibrating member of the stimuli device; and
- a testing controller, wherein the testing controller is configured to:
  - generate, by controlling the stimuli device, a vibrational signal;
  - receive, from the reference sensor, reference readings corresponding to the vibrational signal;
  - receive, from the target device attached to the support assembly, target device sensor data captured by the target device; and
  - determine, based on the received reference readings and the target device sensor data, a frequency response for the target device.

2. The system of claim 1, wherein the support assembly is constructed from one or more ceramic materials.

3. The system of claim 2, wherein the support assembly is constructed by one or more additive manufacturing processes.

4. The system of claim 3, wherein the additive manufacturing process is Stereolithography (SLA) 3D printing, and wherein the starting material is a ceramic resin comprising a photopolymerizable monomer and ceramic particles.

5. The system of claim 4, wherein the ceramic particles are an oxide based ceramic material, and wherein the oxide based ceramic material is:

- alumina (Al2O3);
- zirconia (ZrO2);
- silica (SiO2); or
- yttria (Y2O3).

6. The system of claim 4, wherein the ceramic particles are a carbide, nitride or MAX Phase based ceramic material.

7. The system of claim 4, wherein walls of the support assembly are less than a predetermined thickness, and wherein said predetermined thickness is based on one or more curing properties of the ceramic resin and one or more parameters of the printing process.

8. The system of claim 7, wherein the predetermined thickness is less than 5 mm.

9. The system of claim 8, wherein the support assembly is post processed, and wherein said post processing comprises one or more heat treatment processes.

10. The system of claim 9, wherein the one or more heat treatment processes comprise debinding, sintering, or annealing.

11. A method for determining a frequency response of a target device, wherein the method comprises:

- generating, by a vibrating member of a stimuli device, a vibrational signal, wherein the vibrational signal is a traveling wave in a primary direction, and wherein the generation of the vibrational signal is controlled by a testing controller;
- adjusting, by the testing controller, an amplitude and frequency of the vibrational signal generated by the stimuli device;
- transmitting the vibrational signal through a support assembly to a reference sensor and a target device, wherein the reference sensor and the target device are both rigidly attached to the support assembly, and wherein the support assembly comprises:
  - a support structure comprising one or more hollow regions and one or more ribs;
  - a reference sensor mounting point, wherein the reference sensor mounting point is configured to rigidly attach the reference sensor to the support assembly in a position in line with the traveling wave;
  - a support interface configured to hold, in a horizontal orientation to the primary direction, the target device, wherein a main axis of the target device is perpendicular to the primary direction; and
  - one or more vibration source fixture points, wherein the vibration source fixture points rigidly attach the support assembly to the vibrating member of the stimuli device;
- measuring, by the reference sensor, the generated vibrational signal;
- generating reference data based on the reference sensor measurements;
- measuring, by the target device, the generated vibrational signal;
- generating target data based on the target device measurements;
- retrieving, by the testing controller, the reference data and the target data; and
- determining, by the testing controller, a frequency response for the target device based on the reference data and target data.

12. The method of claim 11, wherein the support assembly is constructed from one or more ceramic materials.

13. The method of claim 12, wherein the support assembly is constructed by one or more additive manufacturing processes.

14. The method of claim 13, wherein the additive manufacturing process is Stereolithography (SLA) 3D printing, and wherein the starting material is a ceramic resin comprising a photopolymerizable monomer and ceramic particles.

15. The method of claim 14, wherein the ceramic particles are an oxide based ceramic material, and wherein the oxide based ceramic material is:

alumina ($Al_2O_3$);
zirconia ($ZrO_2$);
silica ($SiO_2$); or
yttria ($Y_2O_3$).

16. The method of claim 14, wherein the ceramic particles are a carbide, nitride or MAX Phase based ceramic material.

17. The method of claim 14, wherein walls of the support assembly are less than a predetermined thickness, and wherein said predetermined thickness is based on one or more curing properties of the ceramic resin and one or more parameters of the printing process.

18. The method of claim 17, wherein the predetermined thickness is less than 5 mm.

19. The method of claim 18, wherein the support assembly is post processed, and wherein said post processing comprises one or more heat treatment processes.

20. The method of claim 19, wherein the one or more heat treatment processes comprise debinding, sintering, or annealing.

* * * * *